Aug. 6, 1946.　　　　G. GODWIN　　　　2,405,299
TRAILER
Filed May 16, 1945　　　2 Sheets-Sheet 1
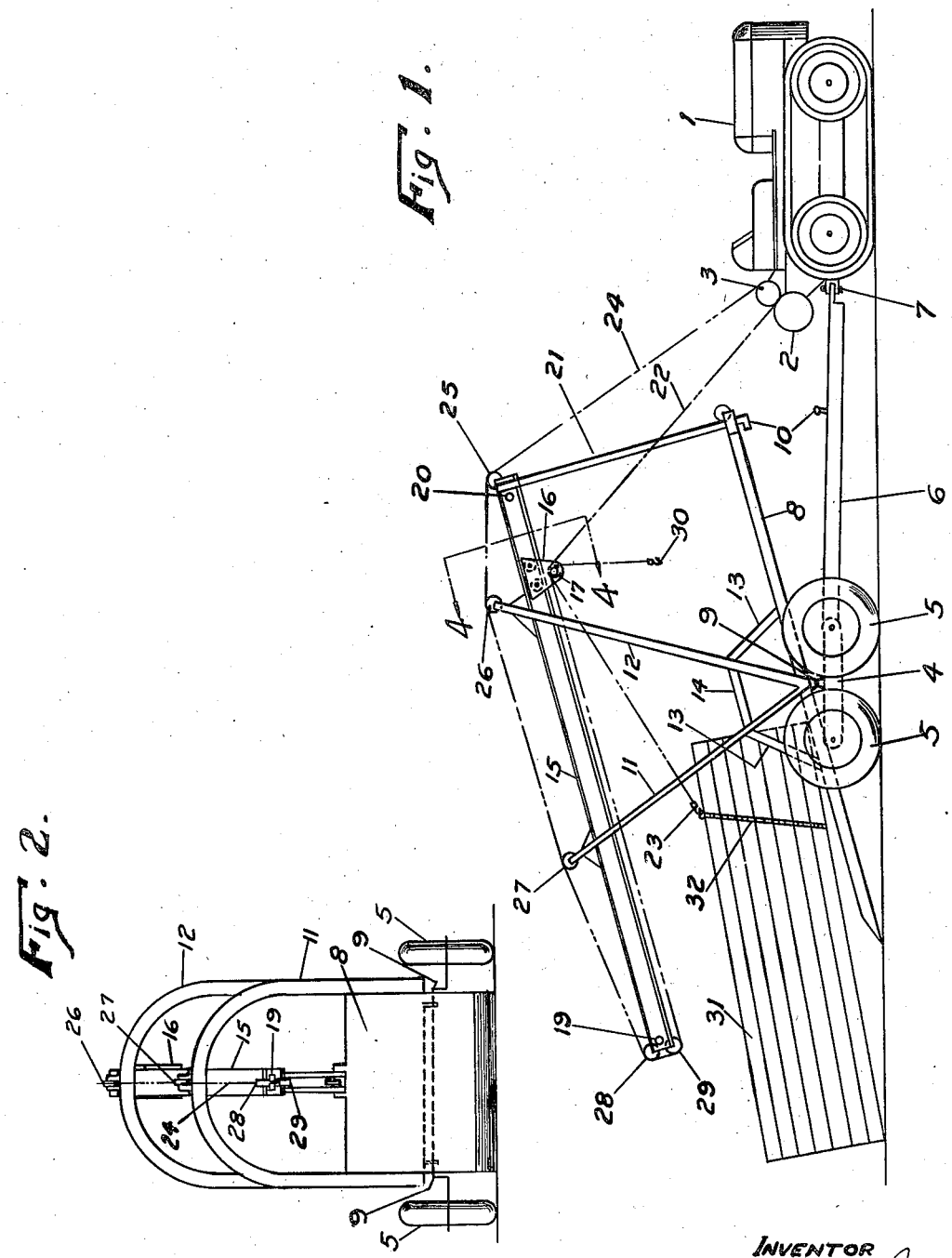
INVENTOR
GORDON GODWIN
BY
ATTORNEY Aug. 6, 1946.    G. GODWIN    2,405,299
TRAILER
Filed May 16, 1945    2 Sheets-Sheet 2
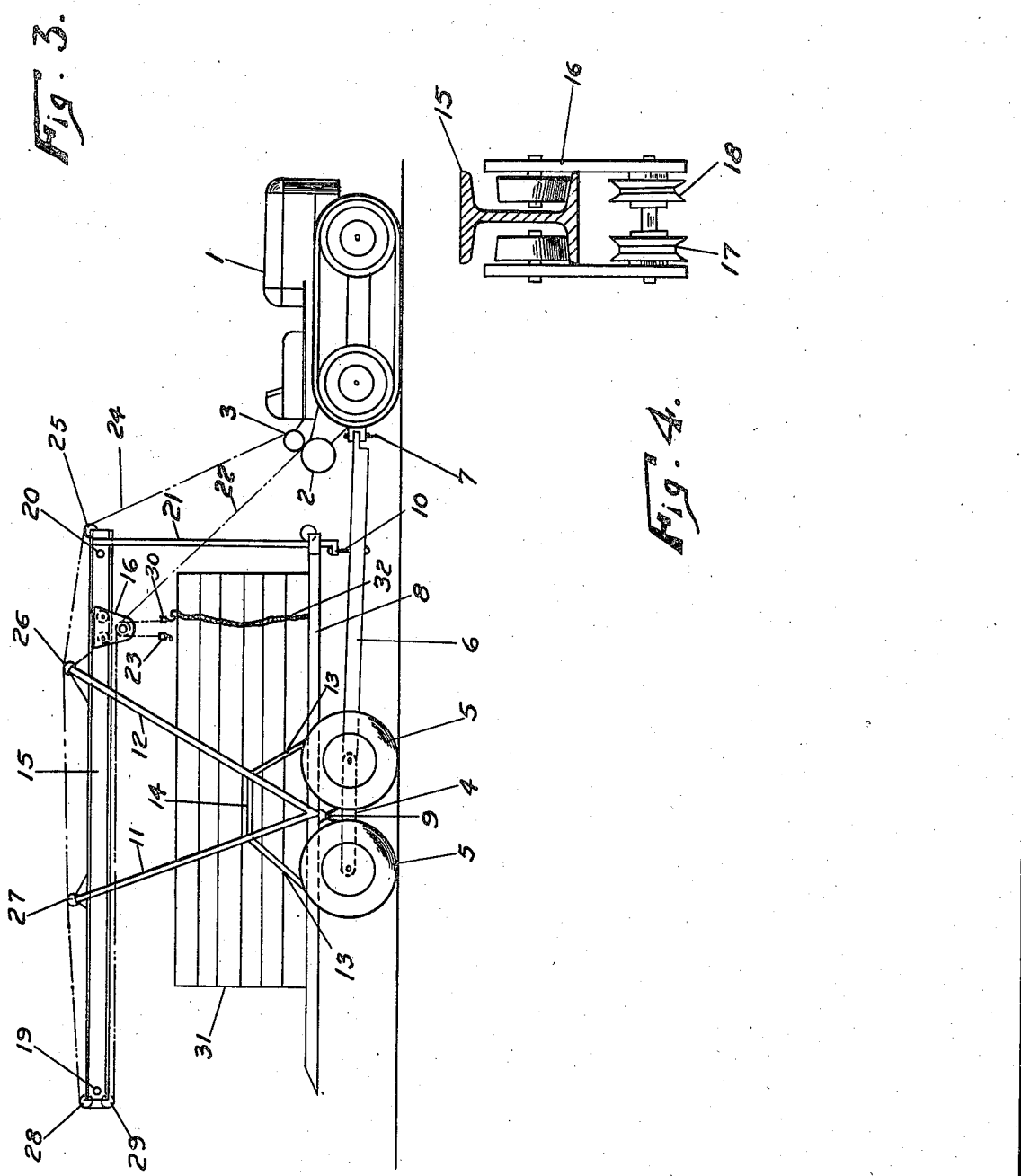
INVENTOR
GORDON GODWIN
BY [signature]
ATTORNEY Patented Aug. 6, 1946

2,405,299

UNITED STATES PATENT OFFICE 2,405,299

TRAILER

Gordon Godwin, Montreal, Quebec, Canada, assignor to The Ontario Paper Company Limited, Thorold, Ontario, Canada Application May 16, 1945, Serial No. 594,010
In Canada February 19, 1945

4 Claims. (Cl. 214—85)

My invention relates to improvements in trailers of the type adapted to be towed by a prime mover and embodying means whereby the trailer may be tilted to facilitate skidding of logs and the like thereonto, together with cable means whereby logs and the like may be both loaded thereonto and unloaded therefrom with a minimum of labour.

An object of the invention is to provide such a logging trailer embodying a novel arrangement of cables and sheaves which permits a load on the ground to be skidded directly onto the trailer by pulling on the cable means, so that in one pull the load is drawn onto the trailer without the necessity of making several hitches to the load and with substantially no labour involved other than that necessary to pull the cable carrying the load.

It is a further object to devise such a trailer in which the cable means may be used to unload the trailer without the necessity of rearranging the cable means or making a series of hitches therewith.

With the above and other objects, which will hereinafter appear, in view the invention consists of the construction and arrangement all as hereinafter more particularly described and illustrated with reference to the accompanying drawings, in which:

Fig. 1 is a side elevational view of a tractor hitched to a logging trailer constructed in accordance with my invention and showing the trailer in position for taking on a load;

Fig. 2 is an end view of the unit as shown in Fig. 1, taken from the rear;

Fig. 3 is a side elevational view corresponding to Fig. 1 and showing the trailer in the loaded position; and Fig. 4 is a fragmentary sectional view taken on the line 4—4 of Fig. 1, showing a track traveller which is part of the invention.

Like characters of reference designate corresponding parts in the different views.

In a preferred embodiment of my invention, as illustrated in the drawings and referring thereto, my trailer takes the form of a wheeled vehicle adapted to be hitched for towing to a track-laying tractor provided with cable traction means in the form of a pair of conventional power driven winches. It is to be understood, of course, that the trailer itself could be provided either with a track-laying undercarriage or a sleigh undercarriage, and that any suitable towing means may be used, such as a conventional truck, or even horses, and that any suitable cable traction means, which includes manual pulling of the cables, may be used if desired.

As illustrated, the trailer is towed by a tractor 1, provided with winches 2 and 3 which may be driven by a connection to the motor of the tractor. The trailer proper comprises an undercarriage, designated broadly as 4, provided with wheels 5 and a towing shaft 6 provided with a conventional draft coupling 7, by which the trailer may be removably connected to the tractor 1.

Mounted on the undercarriage 4 of the trailer is a tiltable load-carrying platform 8, tiltable on trunnions 9 to permit the platform to rock from the position shown in Fig. 1, in which the rear of the platform engages the ground to permit skidding of a load thereonto, to the horizontal position shown in Fig. 3, for transporting the load. As shown, the platform is provided with releasable latch means 10, engageable with the towing shaft 6 for holding the platform in the horizontal position.

The loading mechanism is supported on an upright structure carried by the loading platform which, in the form shown, consists of a pair of substantially inverted U-shaped members 11 and 12, which may be braced with members such as 13 and 14. Secured to the apices of the members 11 and 12, and extending longitudinally of the trailer, is a monorail track 15 which is substantially co-extensive with the length of the platform. This monorail track carries a traveller 16, of conventional construction, as shown in Fig. 4, but provided with two cable sheaves 17 and 18 respectively, and while the traveller is free to travel from one end of the track to the other, it is prevented from coming off the track by stops 19 and 20 secured to either end of the track. Additional support for the track may be provided in the form of uprights 21 at the front of the platform 8.

The loading mechanism is completed by a cable 22 extending from the winch 2, over the sheave 17, and terminating in a hook 23 for engaging the load, together with a second cable 24 extending from the winch 3 over a series of fairlead sheaves 25, 26, 27, 28 and 29, mounted on the track 15 and/or the upright members 11, from which the cable 24 passes over the sheave 18 of the track traveller and terminates in means such as a hook 30 for engaging the load to be unloaded.

In the drawings a load of logs 31 is shown for purposes of illustration, provided with a sling 32 by means of which the load may be readily connected to the cables.

A trailer, constructed according to my invention, operates as follows: When it is desired to pick up a load with the trailer, the trailer unit is backed, by maneuvering the tractor 1, until the platform 8 is in line with the load and the latch 10 is then released to permit the platform 8 to tilt until the rear of the platform contacts the ground adjacent to the load. The cable 22 is then paid out from the winch 2 until its hook 23 may be hooked to the sling 32 of the load. As the cable is paid out, operation of the winch 3 will tighten the cable 24 until the hook 30 blocks in the traveller 16. Continued pull by the winch 3 will move the traveller 16 to a position near the rear end of the track 15. The winch 2 is then operated to pull the cable 22, whereupon the platform 8 is tilted until its rear end touches the ground and the load is skidded up the slope of the platform 8 by the combined lifting and dragging force of the cable passing over the sheave 17; since the sheave 17 is carried by the track traveller 16, which is free to move along the track 15, the line of pull on the load will be automatically maintained in a direction which will carry the load onto the platform with a minimum of power, and by the same token as soon as the centre of gravity of the load passes the axis of the trunnions 9, the platform 8 will tilt into the horizontal position again and the platform may be latched in such position with the latch 10. The loaded trailer may then be moved to the point where it is to be unloaded, and for unloading it is merely necessary to disconnect the hook 23 from the sling 32 of the load and connect the hook 30 thereto, whereafter the latch 10 is released and, on operating the winch 3 the cable 24 lifts the forward end of the load, and by virtue of the track traveller being free to move along the track as before, the load is drawn rearwardly of the trailer until its centre of gravity passes the axis of the trunnions 9, whereupon the platform 8 tilts and the load is skidded completely off the platform 8.

It will thus be obvious that I have invented an improved trailer with novel loading and unloading means whereby a relatively awkward load may be loaded and unloaded by the simple operation of connecting a cable to the load and operating the power winches of the unit used to tow the trailer, all of the mechanism being so organized that, for example, it is possible for one man to load, transport, and unload a load as great as the combined power and trailer unit is capable of carrying.

While I have shown one preferred embodiment of my invention in the drawings and description herewith, it is to be understood that such disclosure is merely for the purposes of illustration and is intended to impose no limitation on the scope of the invention beyond those set forth in the appended claims.

What I claim as my invention is:

1. A loading and transporting vehicle comprising an undercarriage, a load carrying platform mounted thereon and automatically tiltable on an axis disposed transversely of the vehicle, a track mounted above the platform and extending longitudinally of the vehicle, a traveller on said track, a sheave carried by said traveller, cable traction means located adjacent one end of said platform, a cable extending from said traction means and passing over the sheave carried by the traveller, and means at the free end of said cable for engaging material to be loaded onto the vehicle.

2. The combination, with a towing vehicle, of a trailer vehicle comprising an undercarriage, draft coupling means between the undercarriage and the towing vehicle, a load carrying platform mounted on the undercarriage and automatically tiltable on an axis disposed transversely of the traction vehicle, a track mounted above the platform, and extending longitudinally of the trailer vehicle, a traveller on said track, a sheave carried by said traveller, cable traction means mounted on said towing vehicle, a cable extending from said traction means and passing over the sheave carried by the traveller, and means at the free end of said cable for engaging material to be loaded onto the tractor vehicle.

3. In a combination as claimed in claim 2, a second cable traction means mounted on said towing vehicle, a second cable extending therefrom, a plurality of sheaves on said track for carrying the second cable from the second traction means to the end of said track opposite therefrom and back to said track traveller, a second sheave in said traveller over which said second cable passes, and means at the free end of said second cable for engaging material to be unloaded from the vehicle.

4. In a trailer, an undercarriage, a load carrying platform mounted thereon and automatically tiltable on an axis disposed transversely on the trailer, a plurality of members of substantial inverted U-shape each extending from one side of the platform to the other side of the platform, a track secured to the apices of the U-shaped members and extending longitudinally of the platform, a traveller on said track, and a sheave carried by the traveller.

GORDON GODWIN.